United States Patent [19]
Covert

[11] 3,729,133
[45] Apr. 24, 1973

[54] MODEL ROADWAY TRACK

[75] Inventor: Garry C. Covert, Baroda, Mich.

[73] Assignee: Heath Company, Benton Harbor, Mich.

[22] Filed: July 26, 1971

[21] Appl. No.: 166,166

[52] U.S. Cl. .....................238/10 E, 104/149, 191/2
[51] Int. Cl. .............................................A63h 18/12
[58] Field of Search ................238/10 E, 10 F, 10 A; 104/60, 148, 149; 46/1 K; 191/2

[56] References Cited

UNITED STATES PATENTS

| | | | |
|---|---|---|---|
| 3,288,368 | 11/1966 | Athearn | 238/10 F |
| 3,592,384 | 7/1971 | Tomaro | 238/10 E |
| 3,243,120 | 3/1966 | Lingard et al. | 238/10 F |

Primary Examiner—Gerald M. Forlenza
Assistant Examiner—Richard A. Bertsch
Attorney—William R. Sherman et al.

[57] ABSTRACT

A track assembly includes an interdigitated arrangement of foil conductive strips which are fixedly mounted on one surface of an electrical non-conductive baseplate. On the underside of each section of baseplate is a dovetail connector arrangement which interlocks with a similar dovetail arrangement of an adjacent track section.

6 Claims, 7 Drawing Figures

Patented April 24, 1973

INVENTOR.
Garry C. Covert

BY

ATTORNEY

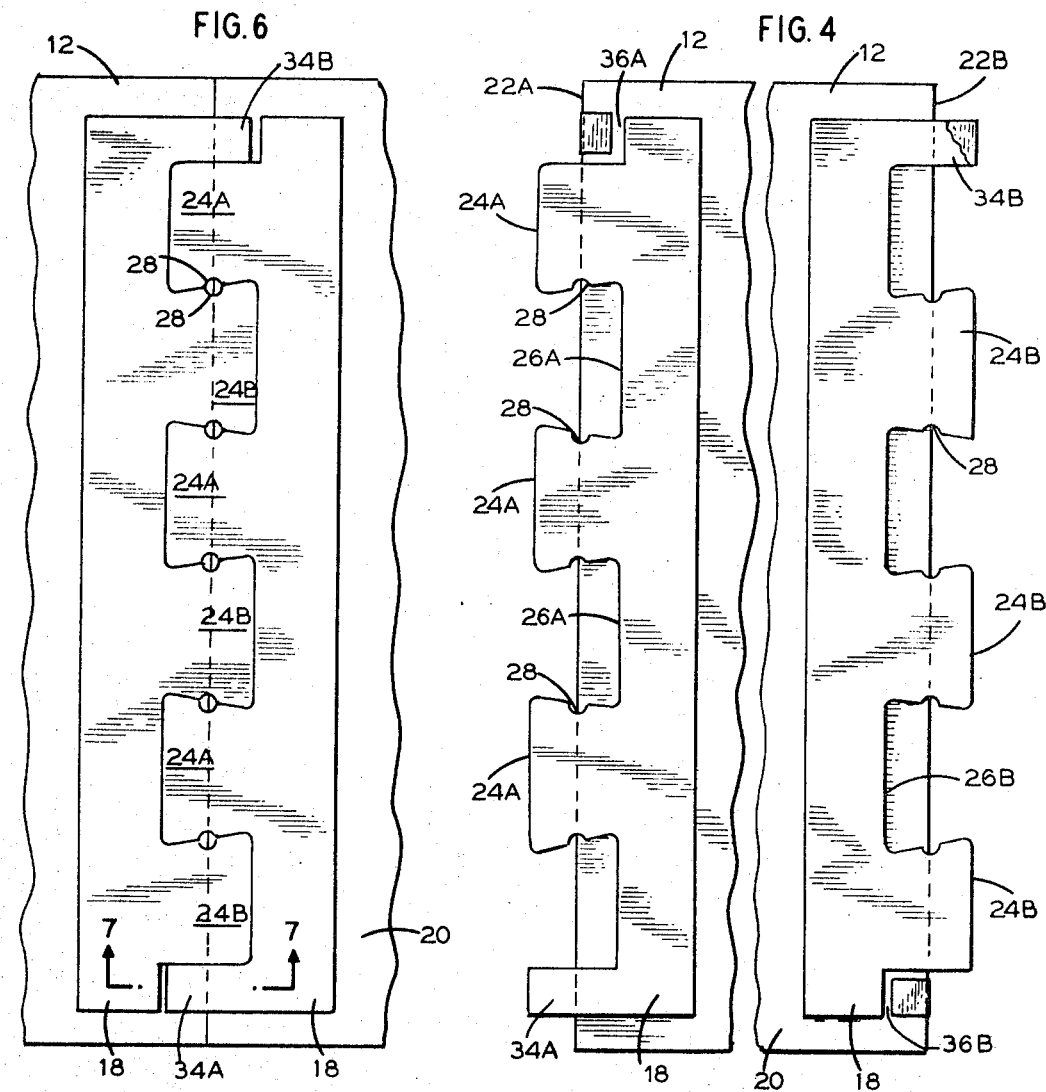
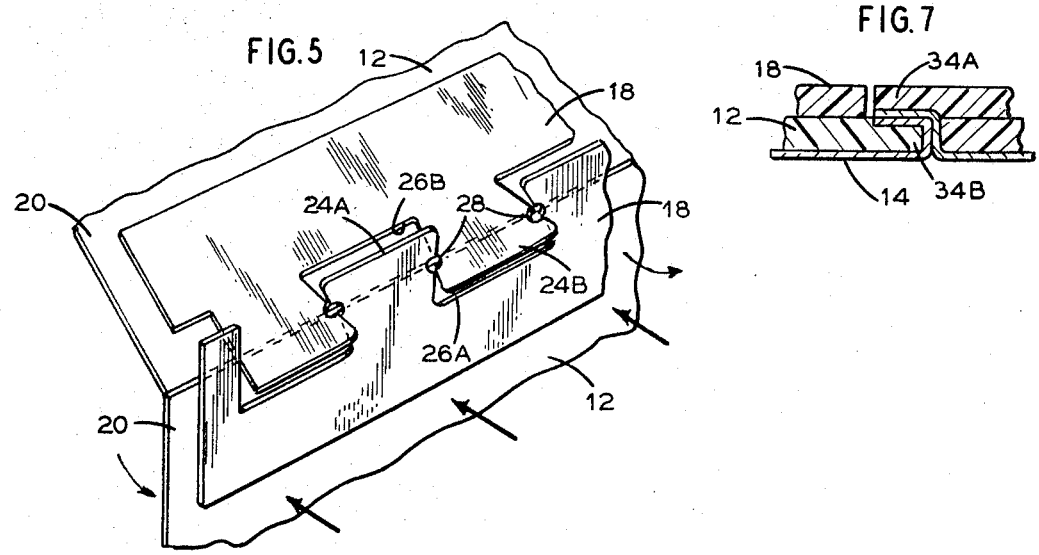

MODEL ROADWAY TRACK

This invention relates to model road racing systems and more particularly to electrically conductive sections of track or roadway for use with an electrically powered model vehicle.

One known model road racing system, generally referred to as a slot car system, includes a track arrangement having a slot extending along the track sections and centrally positioned between a pair of conductive wires or bars embedded in the track lengthwise thereof. Means are provided for making electrical connection to each of these wires such that the track may be electrically powered. A vehicle containing a DC motor and having a tab member projecting from the underside thereof is positioned on the track such that the tab seats in the slot. On the underside of the vehicle there is also included a pair of brushes or conductive contact members which are arranged to engage the respective wire or bar members in the track with the tab member seated in the track slot. In this manner, power from the wires in the track is coupled to the car to energize the motor such that the car may be caused to move along the track. No means are provided for steering of the car as the car is guided along the track by means of the tab which seats in the central slot.

Another model road racing system has been proposed which uses a slotless type of track wherein a pair of electrically conductive members are arranged in a particularly spaced pattern or array along the track. A car includes a plurality of brush or wire contact members extending from the underside thereof and spaced such that there will be at least one contact in engagement with each of the track conductive members, regardless of the orientation or position of the car on the track. In this manner, power will always be fed to the brush contacts on the car to energize one or more motors therein to cause the car to be propelled. Various systems for providing signals to the car to control its speed and allow it to be steered along the roadway, since in this instance no guide slot is provided, are known in the art and will not be discussed herein. It is, however, to this type of road racing system to which the present invention is directed and more particularly to a track construction for use with a "slotless" car and for the interconnection of like sections of track such that a continuous electrical connection is provided upon said inter-connection.

Accordingly, it is an object of the invention to provide a track construction which facilitates easy electrical and mechanical interconnection between sections thereof.

It is another object of the invention to provide a track construction which includes an end coupling means for establishing a self-aligning and interlocking connection between adjoining track sections.

Briefly described, a track section construction in accordance with the present invention includes a base plate having end portions provided with a plurality of projecting tab members interspaced by a plurality of adjacent recessed areas or cavities formed in the underside of the base plate at each end thereof such that each tab member at one end of the base plate is aligned with a recessed area at an opposite end, thereby to mate with and be interlocked within a corresponding recessed area of a like section of roadway. Electrical contact means in the form of a plurality of conductive strips is provided on the top surface of the base plate and is arranged to provide one or more conductive paths there along.

The novel features which are considered characteristic of the invention are set forth with particularity in the appended claims. The invention, however, as well as additional objects and features thereof will best be understood from the following description when read in connection with the accompanying drawing in which:

FIG. 4 is a bottom view of a straight track section of FIG. 1;

FIG. 5 is a perspective view showing the assembly of the end portions of two adjacent sections of track;

FIG. 6 is a bottom view of the end portions of two adjacent sections of track and showing the dovetail tab member interconnections therebetween; and FIG. 7 is a partial sectional view showing the interconnection of the end portions of two track sections and taken along lines 7—7 of FIG. 6.

Figure 1:
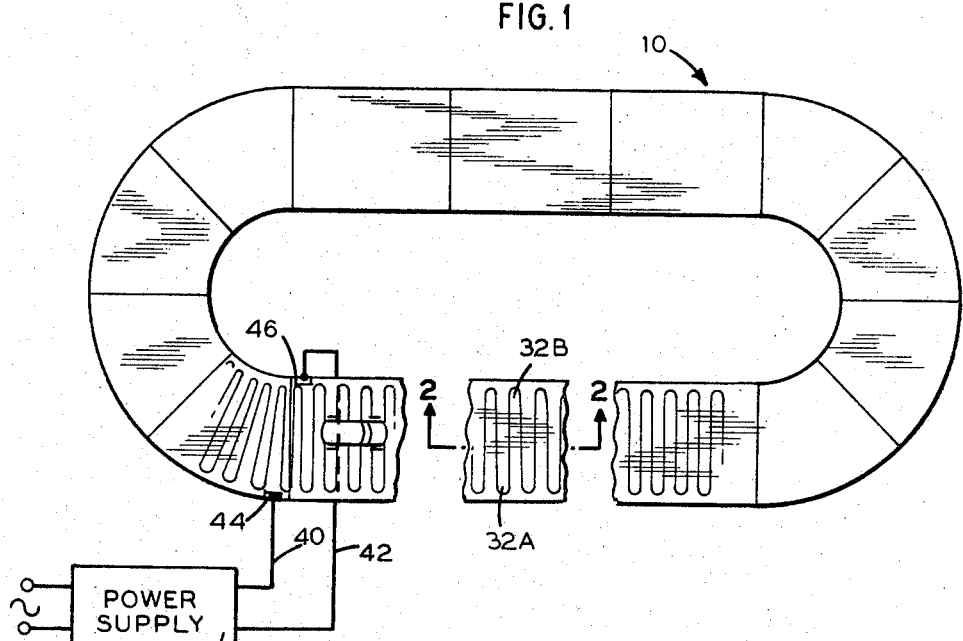
FIG. 1 is a top plan view of a particular roadway configuration assembled from track sections constructed in accordance with the present invention.
Figure 2:
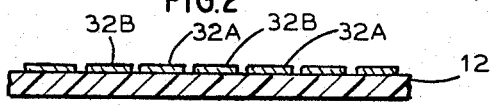
FIG. 2 is a section view through one track section taken along lines 2—2 of FIG. 1.

Referring now to the drawings and first to FIG. 1 thereof, there is shown an illustrative track layout comprising a number of straight and arcuate or curved track sections constructed in accordance with the present invention and interconnected together to form an oval like configuration as shown.

Figure 3:
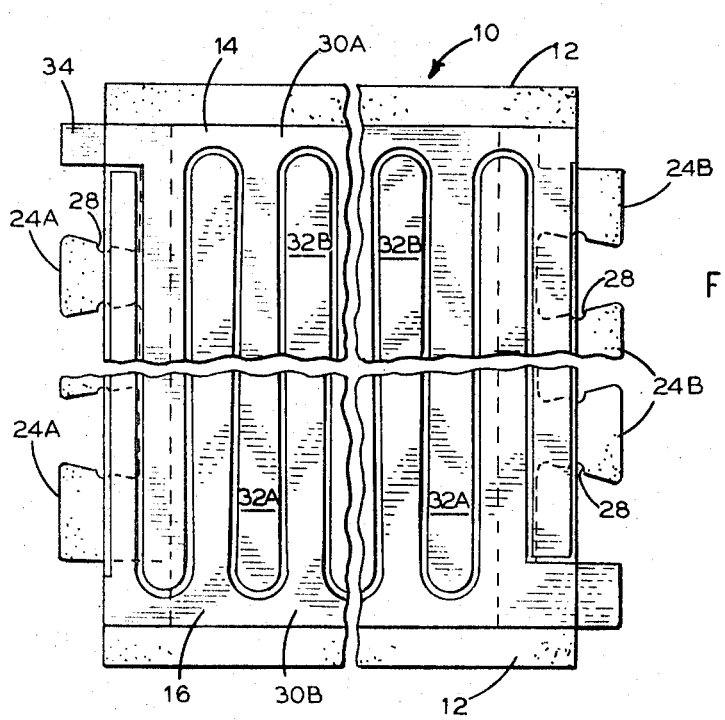
FIG. 3 is a top plan view of one of the straight sections of track in FIG. 1.

With reference now to FIGS. 3 and 4, a singular representative straight section of track 10 of the present invention will be seen to include a baseplate 12, fabricated from a non-conductive material such as plastic and having an interdigitated arrangement of two electrically conductive strips 14 and 16, as for example, aluminum foils, which are adhered to the top surface of the baseplate 12 by any suitable adhesive means. Extending out from a raised level 18 formed on the underside 20 of the baseplate 12 and at opposite ends 22A and 22B are a plurality of dovetail shaped tab members, indicated as 24A at one end and 24B at the opposite end of the basic plate 12, and end tab members 34A and 34B. The tab members 24A and 24B are equally spaced along the respective end portions 22A and 22B, and define a plurality of correspondingly shaped recessed areas 26A and 26B between adjacent tab members as shown. The dovetail tabs 24 and recessed areas 26 serve as a connector arrangement which interfits with a similar dovetail arrangement on another track section, be it straight or curved, in the assembly of two adjacent track sections. Similarly, the tab member 34 on one track section interfits with recessed area 36 in another track section to provide an electrical connection thereto as will hereinafter be described.

Referring again to the bottom view of the track section in FIG. 4, a notch 28 is formed in the side walls of the tab members 24 adjacent to the baseplate ends so as to provide a laterally enlarged area for receiving mating tab members in the interconnection of two rack sections.

It will be noted that in the preferred embodiment illustrated in the Figures, the dovetail arrangement at each side of a track section includes the same number of tab members 24A and 24B and that the tab members at one end of a track section are offset from the elements at the other end such that each tab member at one end is aligned with a corresponding recessed area at the track section other end. This assures that each of the track sections can be connected only in the proper manner and are interchangeable.

Turning again to the top view of the track section shown in FIG. 3, each of the electrical contact means or conductive strips 14 and 16 will be seen to be made of first portions 30A and 30B respectively extending lengthwise along the baseplate top surface at opposite sides thereof, and of second portions 32A and 32B each providing a plurality of spaced-apart finger-like members extending transverse to their respective first portions, the finger members of one second portion 32A being interspaced between, but not in contact with, the finger members of the other second portion 32B as shown.

The assembly and interconnection of two adjacent sections of track will now be described with reference particularly to FIGS. 5, 6 and 7 in the drawings.

The two track sections to be assembled together are first oriented such that the adjacent ends of each track to be interconnected together define an angle therebetween of approximately 90° with one another so that the tab members spaced at one end, for example, are received within a corresponding laterally enlarged area defined by the notches formed in the sidewalls of oppositely disposed and spaced tab members of another track end and as shown particularly in FIG. 5. The two track sections are thereafter oriented to a flat or coplanar position relative to one another so that each of the dovetail shaped tab members in one track end seats in and is received within a corresponding dovetail shaped recessed area in the interconnecting track end. The completed assembly of two track sections is shown particularly in FIG. 6. It will be noted that in the assembled position, the end tab member associated with one track section mates with a corresponding recessed area associated with another track section to provide an electrically conductive contact between the foil member first portions along one side of the baseplate. This may be seen particularly in the cross section view of FIG. 7.

It will be noted that the curved or arcuate sections of track have their tab member end portions constructed substantially in the same manner as the end portions of a straight section of track as has been described. It will be further noted, however, that the interdigitated finger portions of the conductive foil strips in the curved track sections follow radially oriented lines, rather than parallel lines as is the case for straight track sections. It will be understood that the conductive foil portions could be arranged in a pattern other than that shown for the arcuate and straight track sections depicted in the Figures. Also, a pattern arrangement offering more than two conductive paths may be provided, while still utilizing the dovetail connector arrangement features of the present invention.

With a plurality of track sections of the invention interconnected together as shown, for example in FIG. 1, connections from a signal and power supply 38 may be made via wires 40 and 42 to respective terminal clips 44 and 46 which are attached to conductive strip foil member first portions on each side of a track section.

More particularly and via the wires from the power supply 38, one conductive strip, as for example 14, may be referenced to ground or a negative potential, while the other conductive strip 16 is referenced to a higher or positive potential. In this way, electrical control signals may be supplied via the track foil conductors to suitable pick-up contacts on the underside of a model vehicle (not shown) thereby to electrically direct the vehicle in powered movement along the track sections.

What is claimed is:

1. A section of roadway for the electrical operation thereon of a model vehicle, comprising:

an electrically non-conductive elongated base plate having a planar top surface, and a plurality of spaced-apart tab members projecting outwardly therefrom at each end and lying in a plane parallel to and recessed from the top surface of said base plate, said tab members being interspaced between a plurality of adjacent recessed areas formed in the underside of said base plate and at each end thereof such that each tab member at one end of said base plate is aligned with a recessed area at an opposite end, thereby to mate with and be receivable within a corresponding recessed area of a like section of roadway;

a first conductive strip positioned on the top surface of said base plate and having a first portion extending along one side thereof and a second portion providing a plurality of spaced-apart finger-like members extending transverse to said first portion;

a second conductive strip positioned on the top surface of said base plate and having a first portion extending along a second side thereof opposite said one side and a second portion providing a plurality of spaced-apart finger-like members extending transverse to said first portion and interposed between the finger-like members of said first conductive strip.

2. A section of roadway as defined in claim 1 wherein each of said conductive strips include a part which is affixed to the top surface of a projecting tab member at one end of the roadway base plate and another part which is folded over and affixed to the under-surface of a corresponding recessed area at an opposite end of the roadway base plate.

3. A section of roadway as defined in claim 2 wherein the opposing sidewalls of said spaced-apart tab members have indentations therein to provide a laterally enlarged spacing between adjacent tab members to facilitate the interconnection therebetween of mating tab members of a like section of roadway.

4. A section of roadway for the electric operation thereon of a model vehicle, comprising:

an electrically nonconductive base plate having a substantially planar and uninterrupted top surface;

a plurality of dovetail tab members spaced transversely from each other and extending outwardly from each of two opposite longitudinal ends of the base plate in plains substantially parallel to the top surface of the base plate, said opposite ends including means defining a plurality of recessed areas formed in the base plate and interspersed between the tab members in an alternating sequence, with each tab member at one end of the base plate aligned longitudinally with a recessed area at the other end of the base plate, and with the tab members and the recessed areas dimensioned to mate with each other, with each tab member receivable within a corresponding recessed area in a like section of a roadway;

at least one of said tab members including means defining at least one notch on a side thereof adjacent the base plate end from which it extends, said notch providing a transversely enlarged spacing between the last recited tab member and an adjacent tab member to facilitate the interconnection of a mating tab member from a like section of a roadway; and electrical contact means affixed to the top surface of said base plate and providing at least one electrically conductive path along the base plate between said opposite ends thereof, said electrical contact means including a portion extending along one of said tab members at one longitudinal end of the base plate and another portion extending along a recessed area at the opposite longitudinal end of the base plate to thereby provide an electrical connection with a like electrical contact means of a like section of a roadway.

5. A section of a roadway for the electrical operation thereon of a model vehicle as in claim 4 wherein said electrical contact means comprise a first conductive strip positioned on the top surface of said base plate and having a plurality of transversely extending spaced apart portions, and a second conductive strip positioned on the top surface of the base plate and having a like plurality of spaced apart transversely extending projections, with the spaced apart projections of the first and second conductive strips alternating longitudinally, and with the first and second conductive strips being electrically isolated from each other by a dividing portion of said nonconductive base plate.

6. A section of a roadway for the electrical operation thereon of a model vehicle as in claim 5 wherein each of said conductive strips includes a part which is affixed to the top surface of tab member at one end of the roadway base plate and another part which is folded over and affixed to the undersurface of a corresponding recessed area at the longitudinally opposite end of the roadway base plate.

* * * * *